US010579489B2

(12) United States Patent
Nishikawa et al.

(10) Patent No.: US 10,579,489 B2
(45) Date of Patent: Mar. 3, 2020

(54) PROGRAM EXECUTION DEVICE, PROGRAM EXECUTION SYSTEM, AND PROGRAM EXECUTION METHOD

(71) Applicant: Mitsubishi Electric Corporation, Tokyo (JP)

(72) Inventors: Koji Nishikawa, Tokyo (JP); Takahiro Ueno, Tokyo (JP); Shigeru Hashimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 156 days.

(21) Appl. No.: 15/569,157

(22) PCT Filed: Jul. 30, 2015

(86) PCT No.: PCT/JP2015/071594
§ 371 (c)(1),
(2) Date: Oct. 25, 2017

(87) PCT Pub. No.: WO2017/014829
PCT Pub. Date: Feb. 2, 2017

(65) Prior Publication Data
US 2018/0150366 A1    May 31, 2018

(51) Int. Cl.
*G06F 11/20* (2006.01)

(52) U.S. Cl.
CPC ...... *G06F 11/2046* (2013.01); *G06F 11/2023* (2013.01); *G06F 11/2035* (2013.01); *G06F 11/203* (2013.01); *G06F 2201/85* (2013.01)

(58) Field of Classification Search
CPC ............ G06F 11/2046; G06F 11/2023; G06F 11/203; G06F 11/2043
See application file for complete search history.

(56) References Cited

U.S. PATENT DOCUMENTS 4,709,325 A    11/1987  Yajima
5,796,937 A     8/1998  Kizuka
(Continued)

FOREIGN PATENT DOCUMENTS

JP    58-107978 A        6/1983
JP    58107978  A *      6/1983  .............. G06F 11/16
(Continued)

OTHER PUBLICATIONS

International Search Report for PCT/JP2015/071594, dated Oct. 27, 2015.

*Primary Examiner* — Yolanda L Wilson
(74) *Attorney, Agent, or Firm* — Sughrue Mion, PLLC; Richard C. Turner

(57) ABSTRACT

In a program execution device (100X), a memory (110) stores first information (101X) specifying one or more programs, and second information (102X) specifying some programs including at least one of programs to be executed by an other program execution device (100Y), out of the programs specified by the first information (101X) and the programs to be executed by the other program execution device (100Y). When an error in the other program execution device (100Y) is not detected by an error processing unit (123), an instruction processing unit (120) executes the programs specified by the first information (101X). When the error in the other program execution device (100Y) is detected by the error processing unit (123), the instruction processing unit (120) executes the programs specified by the second information (102X).

8 Claims, 10 Drawing Sheets

(56) References Cited

U.S. PATENT DOCUMENTS

| | | | | |
|---|---|---|---|---|
| 5,978,933 | A * | 11/1999 | Wyld | G06F 11/1482 714/13 |
| 6,219,801 | B1 * | 4/2001 | Yuge | G06F 11/203 714/13 |
| 6,671,704 | B1 * | 12/2003 | Gondi | G06F 11/2028 707/648 |
| 6,947,752 | B2 * | 9/2005 | Collins | H04Q 11/04 370/216 |
| 9,043,640 | B1 * | 5/2015 | Havemose | G06F 11/203 707/610 |
| 2003/0172106 | A1 * | 9/2003 | Highleyman | G06F 11/1492 718/106 |
| 2007/0067663 | A1 * | 3/2007 | Surasinghe | G06F 11/1482 714/4.1 |
| 2007/0083645 | A1 * | 4/2007 | Roeck | G06F 11/2028 709/224 |
| 2007/0288481 | A1 * | 12/2007 | Shinn | G06F 11/203 |
| 2009/0019258 | A1 * | 1/2009 | Shi | G06F 11/2028 712/29 |
| 2009/0030587 | A1 | 1/2009 | Yonezawa et al. | |
| 2010/0162042 | A1 | 6/2010 | Inoue et al. | |
| 2013/0254588 | A1 * | 9/2013 | Fujieda | G06F 9/50 714/4.11 |
| 2014/0281524 | A1 * | 9/2014 | Legacy | H04L 67/10 713/168 |

FOREIGN PATENT DOCUMENTS

| | | | |
|---|---|---|---|
| JP | 60-054052 | A | 3/1985 |
| JP | 07-064811 | A | 3/1995 |
| JP | 07-114521 | A | 5/1995 |
| JP | 08-095935 | A | 4/1996 |
| JP | 09-282294 | A | 10/1997 |
| JP | 10-124338 | A | 5/1998 |
| JP | 10124338 | A * | 5/1998 |
| JP | 2001-022599 | A | 1/2001 |
| JP | 2004-310252 | A | 11/2004 |
| JP | 2006-323494 | A | 11/2006 |
| JP | 2008-305317 | A | 12/2008 |
| JP | 2009-030543 | A | 2/2009 |
| JP | 2012-073748 | A | 4/2012 |
| JP | 2012-099000 | A | 5/2012 |
| JP | 2012-198805 | A | 10/2012 |
| JP | 2012-198806 | A | 10/2012 |

* cited by examiner

PROGRAM EXECUTION DEVICE, PROGRAM EXECUTION SYSTEM, AND PROGRAM EXECUTION METHOD

CROSS REFERENCE TO RELATED APPLICATIONS

This application is a National Stage of International Application No. PCT/JP2015/071594 filed Jul. 30, 2015, the contents of all of which are incorporated herein by reference in their entirety.

TECHNICAL FIELD

The present invention relates to a program execution device, a program execution system, and a program execution method.

BACKGROUND ART

In embedded systems required to have high reliability, multi-CPU (central processing unit) configurations are used. In a multi-CPU configuration, even if one CPU fails, a process having been executed by the failing CPU is taken over by another CPU so that the embedded system will not be stopped (refer to Patent Literature 1, for example).

CITATION LIST

Patent Literature

Patent Literature 1: JP 2012-73748 A

SUMMARY OF INVENTION

Technical Problem

In the system disclosed by Patent Literature 1, a substitute CPU taking over the process having been executed by the failing CPU executes the process under a load lower than that of the process executed by the failing CPU. The substitute CPU is required to execute the process of the failing CPU, in addition to a process that the substitute CPU has originally been executing, within a predetermined period length. The substitute CPU thus needs to have room for executing an additional process. Room refers to time or resources for executing processes.

An object of the present invention is to improve the reliability of a system executing programs.

Solution to Problem

A program execution device according to one aspect of the present invention is a program execution device that takes over execution of at least one program from an other program execution device upon occurrence of an error in the other program execution device. The program execution device includes:

a memory to store first information specifying one or more programs, and second information specifying some programs including at least one of programs to be executed by the other program execution device, out of the programs specified by the first information and the programs to be executed by the other program execution device; and an instruction processing unit including an error processing unit to detect the error, the instruction processing unit being configured to execute the programs specified by the first information stored in the memory when the error is not detected by the error processing unit and execute the programs specified by the second information stored in the memory when the error is detected by the error processing unit.

Advantageous Effects of Invention

In the present invention, a program execution device executes, upon detection of an error of an other program execution device, some programs including at least one of programs of the other program execution device, out of programs that the program execution device is executing and the programs of the other program execution device on the basis of predefined information. Even if the program execution device does not have enough room to execute all of the programs that the program execution device is executing and the programs of the other program execution device, the program execution device can take over execution of a program from the other program execution device, and thus the reliability of the system executing programs is improved.

DESCRIPTION OF EMBODIMENTS

Figure 1:
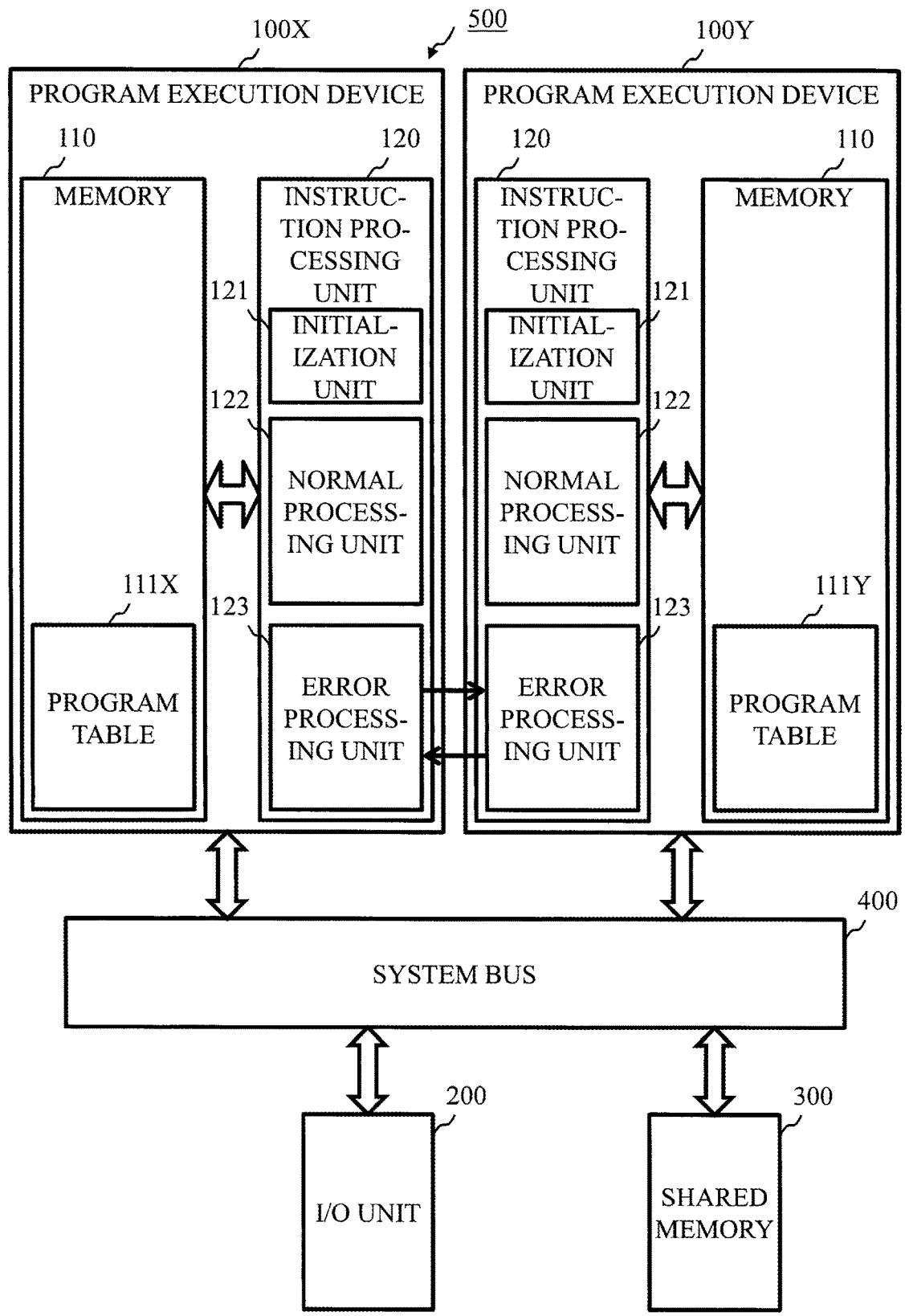
FIG. 1 is a block diagram illustrating a configuration of a program execution system according to a first embodiment.

Embodiments of the present invention will now be described with reference to the drawings. Note that, in the drawings, the same or corresponding parts or components are represented by the same reference numerals. In the description of the embodiments, explanation of the same or corresponding parts or components will not be repeated or will be provided in a simplified manner as appropriate.

First Embodiment

Configurations of a system and a device according to the present embodiment, operation of the device according to the present embodiment, and effects of the present embodiment will be described in this order.

Description of Configuration

A configuration of a program execution system 500, which is the system according to the present embodiment, will be described with reference to FIG. 1.

The program execution system 500 includes a plurality of program execution devices, each being the device according to the present embodiment. The plurality of program execution devices each execute a program individually under normal conditions. In the present embodiment, the plurality of program execution devices each execute a plurality of programs individually. The plurality of program execution devices each take over execution of at least one program from any one of the plurality of the program execution devices upon occurrence of an error in that program execution device.

The number of the program execution devices may be varied as appropriate. In the present embodiment, the program execution system 500 includes two program execution devices 100X and 100Y. The program execution device 100X takes over execution of at least one program from the other program execution device 100Y upon occurrence of an error in the other program execution device 100Y. The other program execution device 100Y operates in the same way upon occurrence of an error in the program execution device 100X.

The program execution system 500 may be any system that executes programs; in the present embodiment, the program execution system 500 is an embedded system that executes predetermined processes by using a plurality of CPUs at a constant frequency. If one CPU fails, a process having been executed by the failing CPU is taken over by another CPU so that the embedded system will not be stopped. As described above, the CPUs refer to the program execution devices 100X and 100Y.

The program execution system 500 further includes an input/output (I/O) unit 200 to control I/O of the program execution system 500, and a shared memory 300 to hold data shared by the program execution devices 100X and 100Y. The program execution system 500 also includes a system bus 400 connecting the program execution devices 100X and 100Y, the I/O unit 200, and the shared memory 300 with one another.

The program execution device 100X includes a memory 110 and an instruction processing unit 120. In the present embodiment, the instruction processing unit 120 is implemented by a CPU. The memory 110 is a local memory used exclusively by the CPU. The local memory may be either inside or outside the CPU; in the present embodiment, the local memory is inside the CPU.

The memory 110 stores programs and data for executing processes. Parity bits are added to the programs and data stored in the memory 110 to allow error detection.

The memory 110 further holds a program table 111X that defines programs for executing processes.

Figure 2:
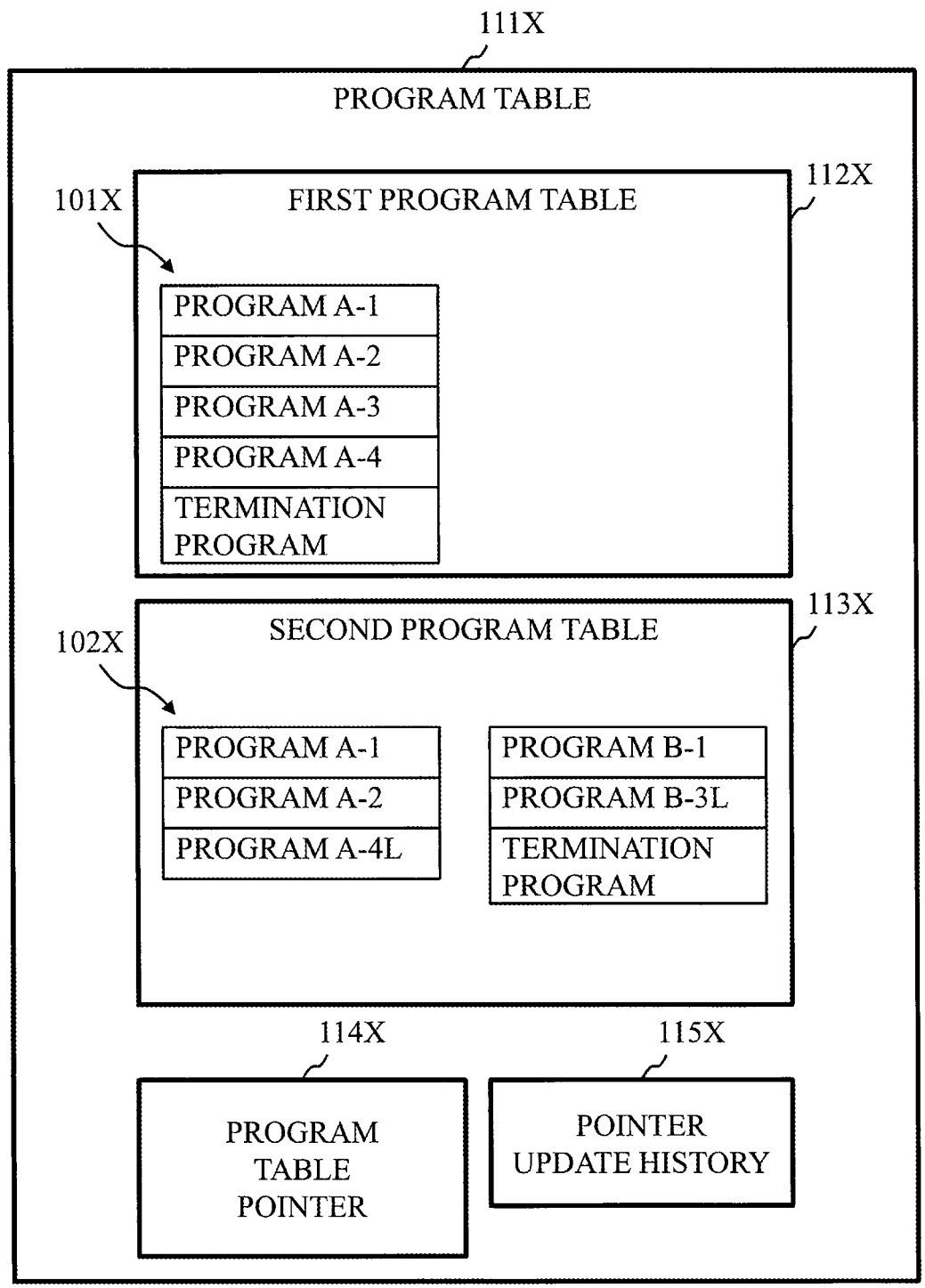
FIG. 2 is a diagram illustrating an example of a program table held by a program execution device according to the first embodiment.

An example of the program table 111X is illustrated in FIG. 2.

The program table 111X includes a first program table 112X, a second program table 113X, a program table pointer 114X, and a pointer update history 115X.

The first program table 112X is a program table for normal operation situations. The "normal operation situations" refers to situations where no occurrence of an error is detected in the other program execution device 100Y. The first program table 112X defines programs to be executed by the program execution device 100X in the normal operation situations. To "define programs" practically refers to storing pointers to the programs, and the programs themselves are located in the shared memory 300. The pointers to the programs are held as first information 101X in the first program table 112X.

In the example of FIG. 2, the first program table 112X holds the first information 101X sequentially presenting programs A-1, A-2, A-3, and A-4, and a termination program. Thus, in the normal operation situations, the program execution device 100X executes the programs A-1, A-2, A-3, and A-4. After finishing execution of the program A-4, the program execution device 100X executes the termination program. The termination program is a program to wait for a next periodic interrupt.

The second program table 113X is a program table for error-detected situations. The "error-detected situations" refers to situations where occurrence of an error in the other program execution device 100Y is detected. The second program table 113X defines programs to be executed by the program execution device 100X in the error-detected situations. As described above, to "define programs" practically refers to storing pointers to the programs, and the programs themselves are located in the shared memory 300. The pointers to the programs are held as second information 102X in the second program table 113X.

In the example of FIG. 2, the second program table 113X holds the second information 102X sequentially presenting programs A-1, A-2, A-4L, B-1, and B-3L and a termination program. Thus, in the error-detected situations, the program execution device 100X executes the programs A-1, A-2, and A-4L, which are some of the programs to be executed in the normal operation situations, and the programs B-1 and B-3L, which are some of the programs having been executed by the program execution device 100Y. After finishing execution of the program B-3L, the program execution device 100X executes the termination program. As described above, the termination program is a program to wait for a next periodic interrupt.

Note that the programs each with an "L" like the program A-4L are programs the processing accuracy of which is lowered or programs kept from being executed depending on the period, in comparison with programs normally executed.

The program table pointer 114X points at either the first program table 112X or the second program table 113X.

The pointer update history 115X is a flag that is cleared when the program table pointer 114X points at the first program table 112X, and set when the program table pointer 114X points at the second program table 113X.

The instruction processing unit 120 executes programs stored in the memory 110. The instruction processing unit 120 includes a comparison circuit for detecting failure.

The instruction processing unit 120 further includes an initialization unit 121, a normal processing unit 122, and an error processing unit 123. Programs to implement the functions of the initialization unit 121, the normal processing unit 122, and the error processing unit 123 are located in the shared memory 300 and loaded into the memory 110 when the CPU is started. The programs, however, may alternatively be in the memory 110 beforehand.

The initialization unit 121 performs an initialization process, which will be described below.

The normal processing unit 122 executes programs defined in the first program table 112X in the normal operation situations.

The error processing unit 123 detects failure of the program execution device 100X through parity check when the instruction processing unit 120 accesses the memory 110. Upon detecting failure of the program execution device 100X, the error processing unit 123 informs the other program execution device 100Y of an error. Furthermore, when the error processing unit 123 is informed of an error from the other program execution device 100Y, the error processing unit 123 takes over a process of the program execution device 100Y. That is, the error processing unit 123 executes programs defined in the second program table 113X in the error-detected situations.

As described above, the memory 110 stores the first information 101X and the second information 102X. The first information 101X is information specifying one or more programs. The second information 102X is information specifying some programs including at least one of the programs to be executed by the other program execution device 100Y, out of the programs specified by the first information 101X and the programs to be executed by the other program execution device 100Y.

In the present embodiment, the first information 101X is information specifying two or more programs. In the example of FIG. 2, the programs A-1, A-2, A-3, and A-4 correspond to the "two or more programs". The second information 102X is information specifying some programs out of the programs specified by the first information 101X and some programs out of the programs to be executed by the other program execution device 100Y. In the example of FIG. 2, the programs A-1, A-2, and A-4L correspond to the former "some programs", and the programs B-1 and B-3L correspond to the latter "some programs".

The instruction processing unit 120 includes the error processing unit 123 to detect an error. The instruction processing unit 120 executes the programs specified by the first information 101X stored in the memory 110 when the error is not detected by the error processing unit 123. The instruction processing unit 120 executes the programs specified by the second information 102X stored in the memory 110 when the error is detected by the error processing unit 123.

The memory 110 further stores, as additional information of the second information 102X, for each program specified by the second information 102X, information indicating whether or not the accuracy of processing in the program is permitted to be lowered or information indicating whether or not the program is kept from being executed depending on the period. In the example of FIG. 2, additional information indicating that the accuracy of processing in the programs A-4L and B-3L is permitted to be lowered is stored; alternatively, additional information indicating that the programs A-4L and B-3L are kept from being executed depending on the period may be stored.

When executing a program specified by the second information 102X, the instruction processing unit 120 refers to the additional information of the second information 102X to determine whether or not to lower the accuracy of processing in the program. When the accuracy of processing is to be lowered, the instruction processing unit 120 converts a floating-point variable contained in the program into an integer variable before executing a process or omits some routines out of routines contained in the program.

The program execution device 100Y has the same configuration as the program execution device 100X except that the program execution device 100Y holds a program table 111Y instead of the program table 111X in the memory 110.

Figure 3:
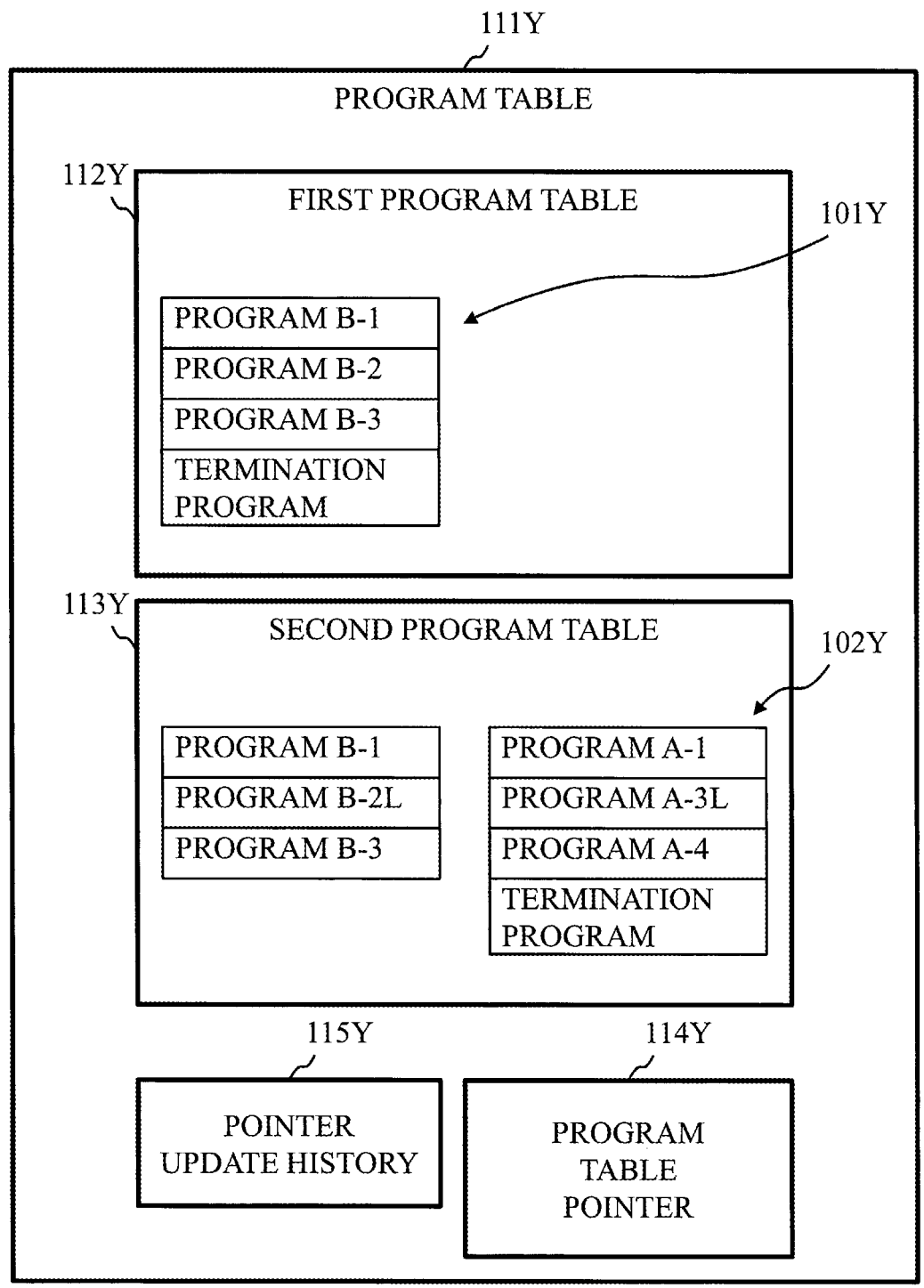
FIG. 3 is a diagram illustrating an example of a program table held by an other program execution device according to the first embodiment.

An example of the program table 111Y is illustrated in FIG. 3.

The program table 111Y includes a first program table 112Y, a second program table 113Y, a program table pointer 114Y, and a pointer update history 115Y.

The first program table 112Y is a program table for normal operation situations similarly to the first program table 112X.

In the example of FIG. 3, the first program table 112Y holds first information 101Y sequentially presenting programs B-1, B-2, and B-3, and a termination program. Thus, in the normal operation situations, the program execution device 100Y executes the programs B-1, B-2, and B-3. After finishing execution of the program B-3, the program execution device 100Y executes the termination program.

The second program table 113Y is a program table for error-detected situations similarly to the second program table 113X.

In the example of FIG. 3, the second program table 113Y holds second information 102Y sequentially presenting programs B-1, B-2L, B-3, A-1, A-3L, and A-4, and a termination program. Thus, in the error-detected situations, the program execution device 100Y executes the programs B-1, B-2L, and B-3, which are programs to be executed in the normal operation situations, and the programs A-1, A-3L, and A-4, which are some of the programs having been executed by the program execution device 100X. After finishing execution of the program A-4, the program execution device 100Y executes the termination program.

The program table pointer 114Y points at either the first program table 112Y or the second program table 113Y.

The pointer update history 115Y is a flag that is cleared when the program table pointer 114Y points at the first program table 112Y, and set when the program table pointer 114Y points at the second program table 113Y.

Description of Operation

Operation of the program execution device 100X according to the present embodiment will be explained with reference to FIGS. 4 and 5. The operation of the program execution device 100X corresponds to a program execution method according to the present embodiment. Note that, since operation of the other program execution device 100Y is similar to that of the program execution device 100X, the explanation thereof will not be provided.

Figure 4:
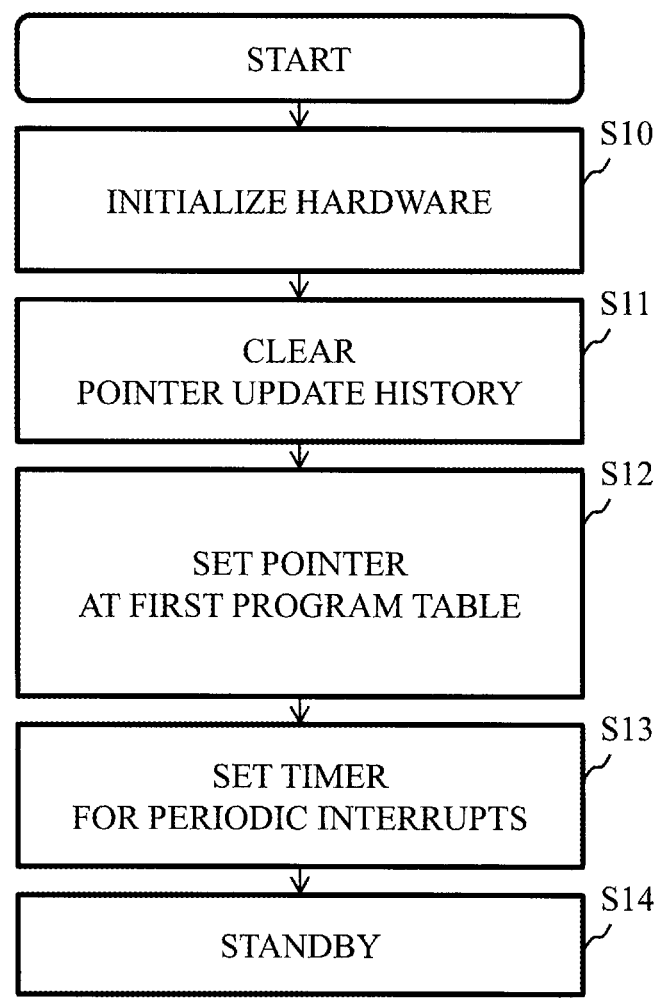
FIG. 4 is a flowchart illustrating operation of the program execution device according to the first embodiment.

FIG. 4 illustrates a flow of when the CPU is started, that is, a procedure of the initialization process.

In step S10, the initialization unit 121 performs initialization of hardware.

In step S11, the initialization unit 121 clears the pointer update history 115X.

In step S12, the initialization unit 121 sets the program table pointer 114X so that the program table pointer 114X points at the first program table 112X.

In step S13, the initialization unit 121 sets a timer for periodic interrupts, which is not illustrated.

In step S14, the instruction processing unit 120 enters a standby loop to wait for occurrence of a periodic interrupt.

Figure 5:
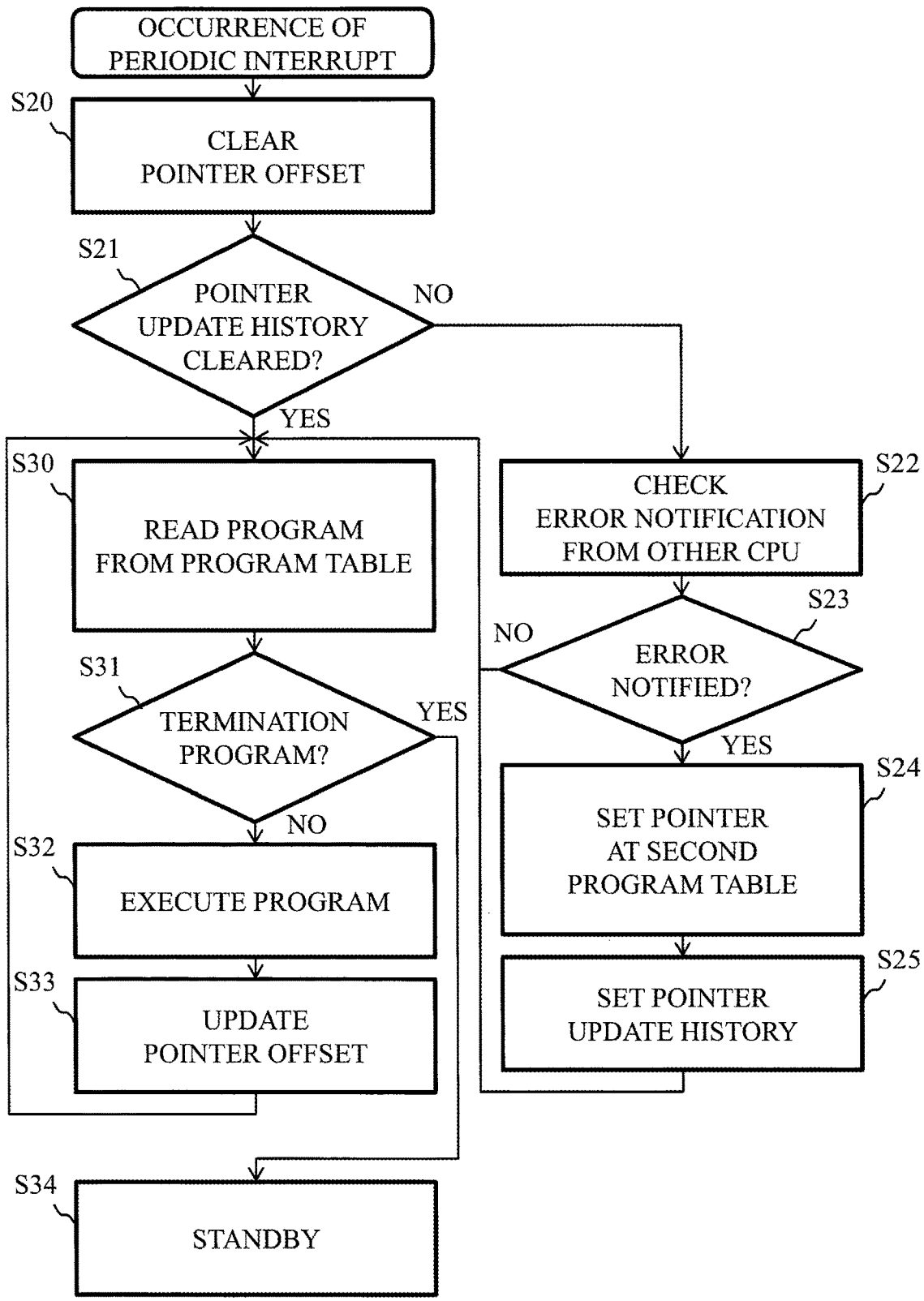
FIG. 5 is a flowchart illustrating operation of the program execution device according to the first embodiment.

FIG. 5 illustrates a flow of when a periodic interrupt of the CPU has occurred.

In step S20, the instruction processing unit 120 clears a pointer offset, which is not illustrated.

In step S21, the instruction processing unit 120 checks whether the pointer update history 115X is cleared or set. If the pointer update history 115X is cleared, the program table pointer 114X is in the state as set in step S12, that is, remains pointing at the first program table 112X. In this case, the flow proceeds to step S30. If the pointer update history 115X is set, the program table pointer 114X is in the state pointing at the second program table 113X. In this case, the flow proceeds to step S22.

In step S22, the error processing unit 123 checks whether or not there is an error notification from an other CPU. The other CPU refers to the other program execution device 100Y.

In step S23, if there is no error notification, the flow proceeds to step S30 while the program table pointer 114X remains pointing at the first program table 112X. If there is an error notification, the flow proceeds to step S24.

In step S24, the error processing unit 123 updates the program table pointer 114X so that the program table pointer 114X points at the second program table 113X to take over processes of the other CPU. When a subsequent periodic interrupt occurs, the flow will go through a path from step S21 to step S30.

In step S25, the error processing unit 123 sets the pointer update history 115X.

In step S30, the instruction processing unit 120 loads a program from a point where the pointer offset is added to the program table pointer 114X. In the example of FIG. 2, if the program table pointer 114X points at the first program table 112X and the pointer offset is cleared, the normal processing unit 122 loads the program A-1. If the program table pointer 114X points at the second program table 113X and the pointer offset is cleared, the error processing unit 123 loads the program A-1.

In step S31, the instruction processing unit 120 checks whether or not the program loaded from the point where the pointer offset is added to the program table pointer 114X is the termination program. If the program is the termination program, the flow proceeds to step S34. If the program is not the termination program, the flow proceeds to step S32.

In step S32, the instruction processing unit 120 executes the loaded program.

In step S33, the instruction processing unit 120 updates the pointer offset, and prepares for loading of the next program. The instruction processing unit 120 repeats the processing from step S30 to step S33 until the termination program is loaded.

In step S34, the instruction processing unit 120 enters a standby loop to wait for occurrence of the next periodic interrupt.

*Description of Effects*

In the present embodiment, the program execution device 100X executes, upon detection of an error of the other program execution device 100Y, some programs including at least one of programs of the other program execution device 100Y, out of programs that the program execution device 100X is executing and the programs of the other program execution device 100Y on the basis of predefined information. Even if the program execution device 100X does not have enough room to execute all of the programs that the program execution device 100X is executing and the programs of the other program execution device 100Y, the program execution device 100X can take over execution of programs from the other program execution device 100Y, and thus the reliability of the program execution system 500 is improved.

In the present embodiment, even if one CPU fails, the other CPU takes over the processes of the failing CPU, thereby keeping the embedded system from being stopped, and thus a highly-reliable embedded system can be achieved. The CPU that takes over processes may continue only some of processes having been executed by the CPU, may lower the accuracy of the processes having been executed, or may skip execution of the processes having been executed depending on the period (that is, may restrict periods during which the processes having been executed are to be executed). The CPU that takes over processes also may take over only some of the newly added processes, may lower the accuracy of the newly added processes, or may restrict periods during which the newly added processes are to be executed. This allows execution of processes to continue system operation within a predetermined period length.

According to the present embodiment, a CPU that serves as a substitute for a failing CPU need not have room for execution of additional processes. Furthermore, since the program tables are used, areas for storing programs need not be increased when programs to be executed in the error-detected situations are the same as those in the normal operation situations. Use of shared areas for storing programs also increases the efficiency of system development.

*Other Configurations*

While the program execution devices 100X and 100Y are CPUs on which local memories are mounted in the present embodiment, the program execution devices 100X and 100Y may alternatively be a combination of CPUs on which local memories are not mounted and local memories connected to the CPUs. Alternatively, the program execution devices 100X and 100Y may be other components capable of executing programs or a combination of other components.

Second Embodiment

Configurations of a system and a device according to the present embodiment, operation of the device according to the present embodiment, and effects of the present embodiment will be described in this order. The description will focus on differences from the first embodiment.

In the present embodiment, when processes are taken over from a failing CPU, changing a predetermined period length can also be conducted in addition to lowering the accuracy of processes or restricting periods during which the process are to be executed.

*Description of Configuration*

Since the configuration of a program execution system 500 that is the system according to the present embodiment is the same as that of the first embodiment illustrated in FIG. 1, the description thereof will not be repeated.

Figure 6:
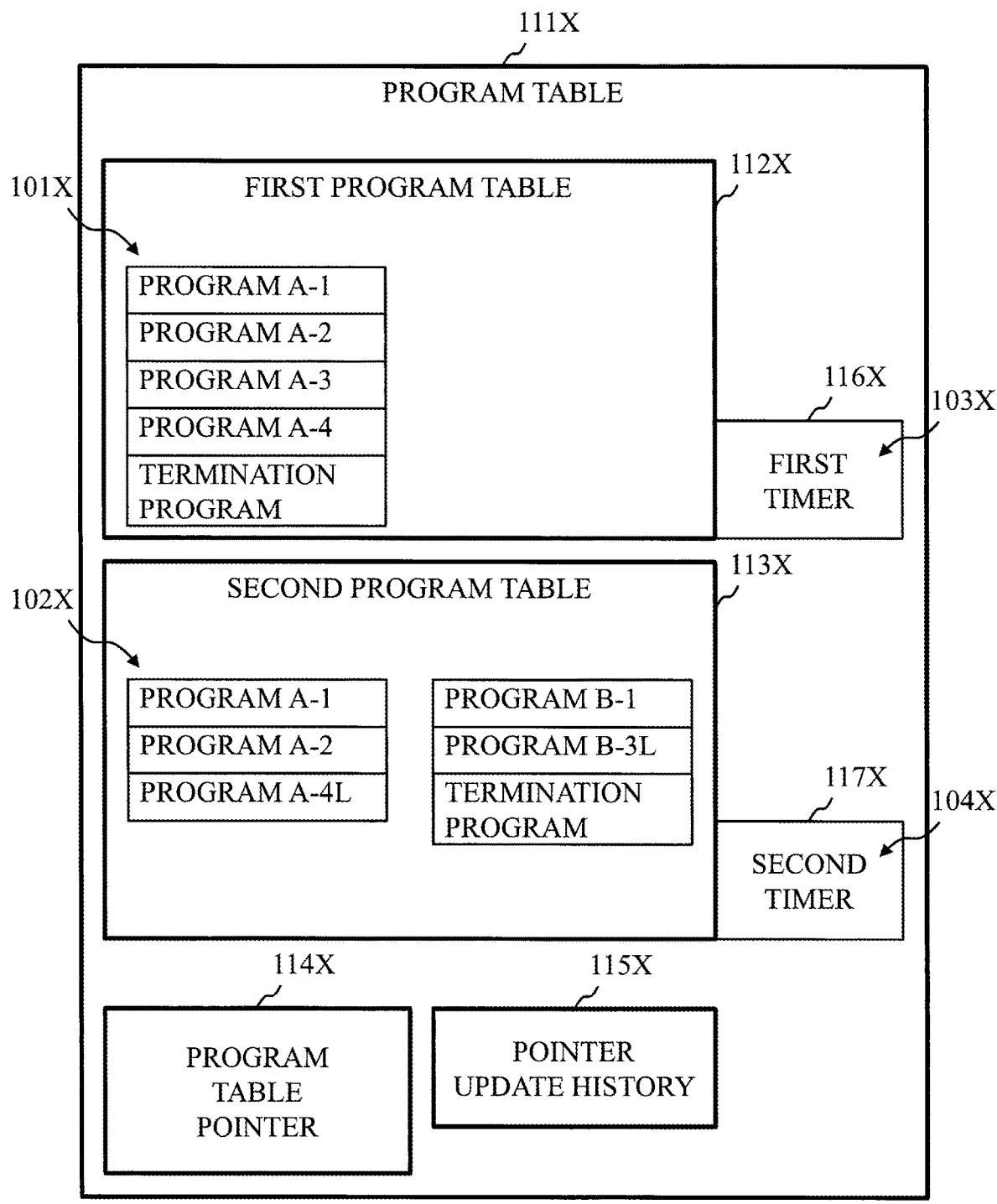
FIG. 6 is a diagram illustrating an example of a program table held by a program execution device according to a second embodiment.

An example of a program table 111X is illustrated in FIG. 6.

The differences between the example of FIG. 2 and the example of FIG. 6 lie in that the program table 111X has a first timer 116X and a second timer 117X.

The first timer 116X is a periodic timer used by a program execution device 100X in normal operation situations. A value of the first timer 116X is held as third information 103X in the program table 111X.

The second timer 117X is a periodic timer used by the program execution device 100X in error-detected situations. A value of the second timer 117X is held as fourth information 104X in the program table 111X.

As described above, a memory 110 stores the third information 103X and the fourth information 104X. The third information 103X is information associated with first information 101X and specifying a period in which programs specified by the first information 101X are to be executed. The fourth information 104X is information associated with second information 102X and specifying a period in which programs specified by the second information 102X are to be executed.

In the present embodiment, the fourth information 104X is information specifying a period longer than that specified by the third information 103X.

When an error is not detected by an error processing unit 123, an instruction processing unit 120 executes the programs specified by the first information 101X in the period specified by the third information 103X stored in the memory 110. When the error is detected by the error processing unit 123, the instruction processing unit 120 executes the programs specified by the second information 102X in the period specified by the fourth information 104X stored in the memory 110.

Figure 7:
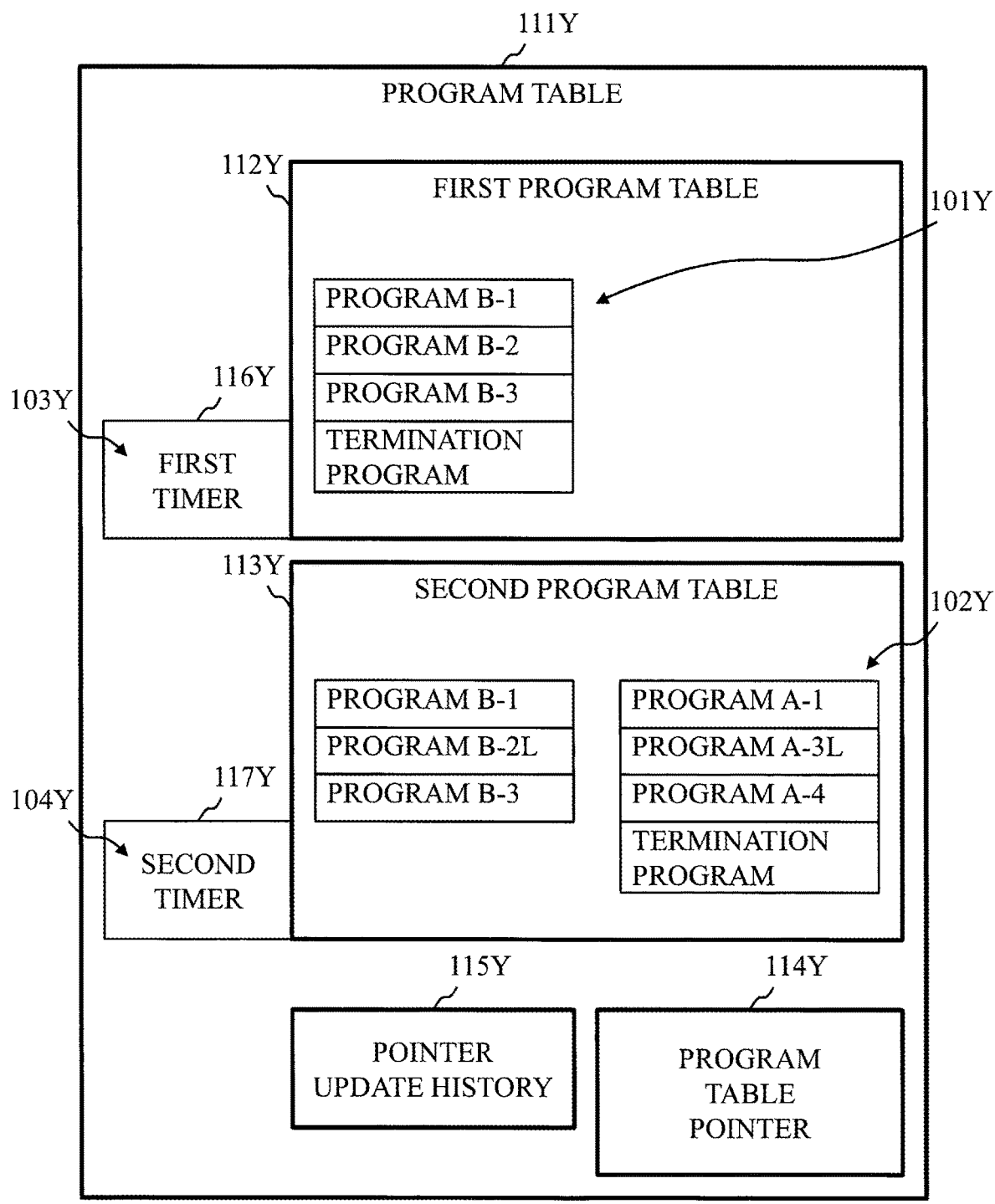
FIG. 7 is a diagram illustrating an example of a program table held by an other program execution device according to the second embodiment.

An example of a program table 111Y is illustrated in FIG. 7.

The differences between the example of FIG. 3 and the example of FIG. 7 lie in that the program table 111Y has a first timer 116Y and a second timer 117Y.

The first timer 116Y is a periodic timer used by a program execution device 100Y in normal operation situations. A value of the first timer 116Y is held as third information 103Y in the program table 111Y.

The second timer 117Y is a periodic timer used by the program execution device 100Y in error-detected situations. A value of the second timer 117Y is held as fourth information 104Y in the program table 111Y.

*Description of Operation*

Operation of the program execution device 100X according to the present embodiment will be explained with reference to FIGS. 8 and 9. The operation of the program execution device 100X corresponds to a program execution method according to the present embodiment. Note that, since operation of the other program execution device 100Y is similar to that of the program execution device 100X, the explanation thereof will not be provided.

Figure 8:
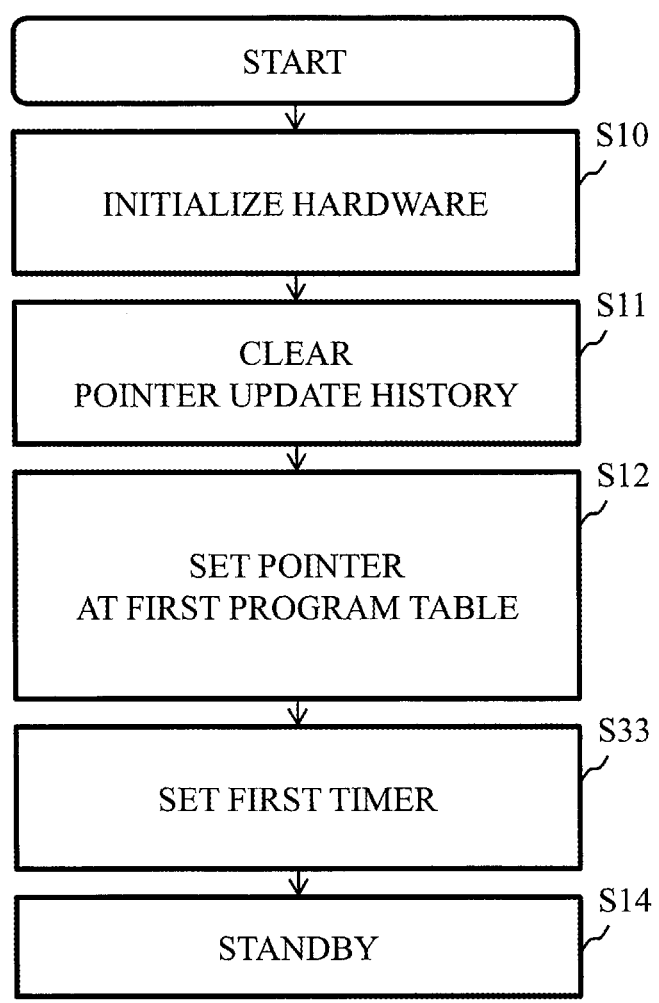
FIG. 8 is a flowchart illustrating operation of the program execution device according to the second embodiment.

FIG. 8 illustrates a flow of when a CPU is started, that is, a procedure of a initialization process.

Processing from step S10 to step S12 is the same as that in the flow illustrated in FIG. 4.

In step S13 in the flow illustrated in FIG. 4, a timer of a period that is previously determined in the system is set. In contrast, in step S33 in the flow illustrated in FIG. 8, an initialization unit 121 sets the first timer 116X, which is a timer of a period determined for the normal operation situations.

Processing in step S14 is the same as that in the flow illustrated in FIG. 4.

Figure 9:
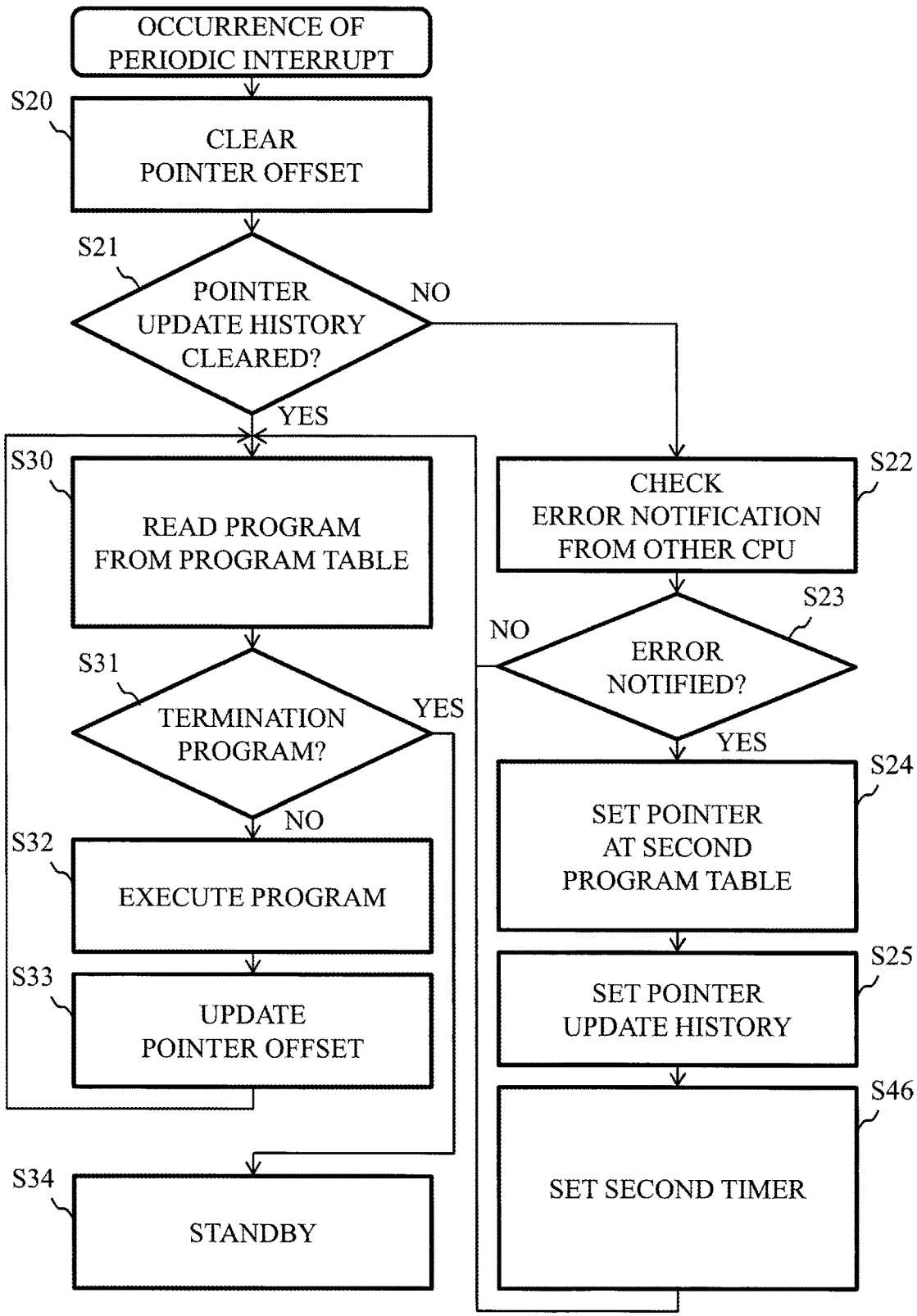
FIG. 9 is a flowchart illustrating operation of the program execution device according to the second embodiment.

FIG. 9 illustrates a flow of when a periodic interrupt of the CPU has occurred.

Processing from step S20 to step S25 is the same as that in the flow illustrated in FIG. 5.

In the present embodiment, processing of step S46 is performed between step S25 and step S30.

After a pointer update history 115X is set in step S25, the error processing unit 123 sets the second timer 117X, which is a timer of a period determined for the error-detected situations, in step S46.

Processing from step S30 to step S34 is the same as that in the flow illustrated in FIG. 5.

*Description of Effects*

In the present embodiment, even if one CPU fails, another CPU takes over processes of the failing CPU, thereby keeping the embedded system from being stopped, and thus a highly-reliable embedded system can be achieved. The CPU that takes over processes not only may take over only some of the newly added processes, may lower the accuracy of the newly added processes, or may restrict periods during which the newly added processes are to be executed, but also changes a predetermined period length. Specifically, the CPU that takes over processes changes the period length to be longer for a process for which a change in the period length is permitted. This allows execution of processes to continue system operation.

An example hardware configuration of the program execution system 500 according to the embodiments of the present invention will now be described with reference to FIG. 10.

The program execution system 500 is a computer. The program execution system 500 includes hardware components such as a processor 901, an auxiliary storage device 902, a memory 903, a communication device 904, an input interface 905, and a display interface 906. The processor 901 is connected to other hardware components via a signal line 910, and controls these hardware components. The input interface 905 is connected to an input device 907. The display interface 906 is connected to a display 908.

The processor 901 is an integrated circuit (IC) to perform processing. Specifically, the processor 901 is a CPU. The processor 901 corresponds to the program execution devices 100X and 100Y illustrated in FIG. 1.

Specifically, the auxiliary storage device 902 is a read only memory (ROM), a flash memory, or a hard disk drive (HDD).

Specifically, the memory 903 is a random access memory (RAM). The memory 903 corresponds to the shared memory 300 illustrated in FIG. 1.

The communication device 904 includes a receiver 921 to receive data and a transmitter 922 to transmit data. Specifically, the communication device 904 is a communication chip or a network interface card (NIC).

The input interface 905 is a port to which a cable 911 of the input device 907 is connected. Specifically, the input interface 905 is a universal serial bus (USB) terminal. The input interface 905 corresponds to the I/O unit 200 illustrated in FIG. 1.

The display interface 906 is a port to which a cable 912 of the display 908 is connected. Specifically, the display interface 906 is an USB terminal or a high definition multimedia interface (HDMI (registered trademark)) terminal. The display interface 906 corresponds to the I/O unit 200 illustrated in FIG. 1.

Specifically, the input device 907 is a mouse, a stylus, a keyboard, or a touch panel.

Specifically, the display 908 is a liquid crystal display (LCD).

The auxiliary storage device 902 that is a recording medium stores programs to implement the functions of the "units" such as the initialization unit 121, the normal processing unit 122, and the error processing unit 123. The programs are loaded into the memory 903, read by the processor 901, and executed by the processor 901. The auxiliary storage device 902 also stores an operating system (OS). At least part of the OS is loaded into the memory 903, and the processor 901 executes the programs to implement the functions of the "units" while executing the OS.

Figure 10:
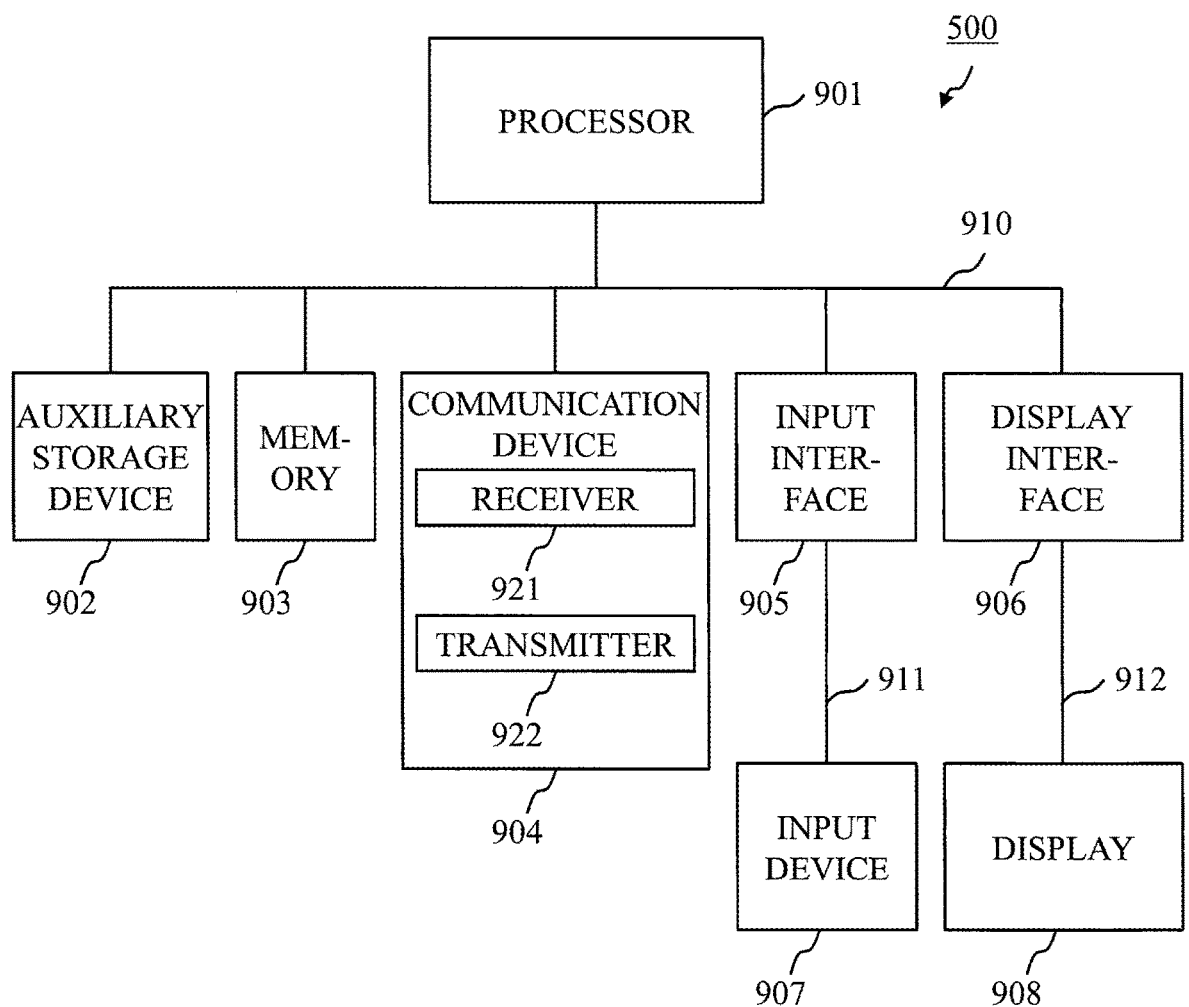
FIG. 10 is a diagram illustrating an example hardware configuration of the program execution system according to the embodiments of the present invention.

While one processor 901 is illustrated in FIG. 10, the program execution system 500 includes a plurality of processors 901 in practice. The plurality of processors 901 individually execute the programs to implement the functions of the "units".

Information, data, signal values, and variable values representing results of processing performed by the "units" are stored in the auxiliary storage device 902, the memory 903, or a register or a cache memory in the processor 901.

The "units" may alternatively be provided in the form of "circuitry". Alternatively, a "unit" may be replaced by a "circuit", a "step", a "procedure", or a "process". The "circuit" and "circuitry" are concepts including not only the processor 901 but also other types of processing circuits such as a logic IC, a gate array (GA), an application specific integrated circuit (ASIC), and a field-programmable gate array (FPGA).

Embodiments of the present invention have been described above; some of the embodiments may be combined to be carried out. Alternatively, any one or more of the embodiments may be partially carried out. Specifically, any one of the "units" described in the embodiments may be used, or any combination of some of the "units" may be used. Note that the present invention is not limited to the embodiments, but various modifications may be made thereto where necessary.

REFERENCE SIGNS LIST

100X, 100Y: program execution device; 101X, 101Y: first information; 102X, 102Y: second information; 103X, 103Y: third information; 104X, 104Y: fourth information; 110: memory; 111X, 111Y: program table; 112X, 112Y: first program table; 113X, 113Y: second program table; 114X, 114Y: program table pointer; 115X, 115Y: pointer update history; 116X, 116Y: first timer; 117X, 117Y: second timer; 120: instruction processing unit; 121: initialization unit; 122: normal processing unit; 123: error processing unit; 200: I/O unit; 300: shared memory; 400: system bus; 500: program execution system; 901: processor; 902: auxiliary storage device; 903: memory; 904: communication device; 905: input interface; 906: display interface; 907: input device; 908: display; 910: signal line; 911: cable; 912: cable; 921: receiver; 922: transmitter

The invention claimed is:

1. A program execution device that takes over execution of at least one program from an other program execution device upon occurrence of an error in the other program execution device, the program execution device comprising:
   a memory that stores first table information specifying two or more programs to be executed by the program execution device during normal conditions, and second table information specifying some, but not all of the two or more programs included in the first table information and also specifying one or more additional programs that were to be executed by the other program execution device before the occurrence of the error in the other program execution device; and
   a processor configured to:
      determine whether the error in the other program execution device has been detected;
      execute one or more of the two or more programs specified by the first table information stored in the memory when the error has not been detected in the other program execution device;
      execute one or more of the programs specified by the second table information stored in the memory when the error has been detected in the other program execution device.

2. The program execution device according to claim 1, wherein the one or more additional programs include two or more additional programs.

3. A program execution device that takes over execution of at least one program from an other program execution device upon occurrence of an error in the other program execution device, the program execution device comprising: a memory that stores first table information specifying two or more programs to be executed by the program execution device during normal conditions, and second table information specifying some, but not all of the two or more programs included in the first table information and also specifying one or more additional programs that were to be executed by the other program execution device before the occurrence of the error in the other program execution device; and a processor configured to: detect the error, execute one or more of the two or more programs specified by the first table information stored in the memory when the error has not been detected in the other program execution device, and execute one or more of the programs specified by the second table information stored in the memory when the error has been detected in the other program execution device, wherein the memory further stores, as additional information of the second table information, for each program specified by the second table information, information indicating whether or not an accuracy of processing in the program is permitted to be lowered, and when executing a program specified by the second table information, the processor refers to the additional information of the second table information to determine whether or not to lower the accuracy of the processing in the program.

4. The program execution device according to claim 1, wherein
   the memory further stores third information that is associated with the first table information and that specifies a period in which the two or more programs specified by the first table information are to be executed, and fourth information that is associated with the second table information and that specifies a period in which the programs specified by the second table information are to be executed, and
   when the error has not been detected in the other program execution device, the processor executes the two or more programs specified by the first table information in the period specified by the third information stored in the memory, and when the error has been detected in the other program execution device, the processor executes the programs specified by the second table information in the period specified by the fourth information stored in the memory.

5. The program execution device according to claim 4, wherein the memory stores, as the fourth information, information specifying a period longer than the period specified by the third information.

6. The program execution device according to claim 1, wherein the memory is a local memory used exclusively by the processor.

7. A program execution system comprising:
   a plurality of program execution devices, each being the program execution device according to claim 1, and taking over at least one program from any one of the plurality of program execution devices upon occurrence of an error in that program execution device.

8. A program execution method comprising:
   determining, by a program execution device, whether an error in an other program execution device has been detected;
   when the error has not been detected in the other program execution device, reading, by the program execution device, from first table information stored in a memory that specifies two or more programs to be executed by the program execution device, and executing, by the program execution device, one or more of the programs specified by the read first table information, wherein the program execution device is configured to take over execution of at least one program from the other program execution device upon occurrence of the error in the other program execution device; and when the error has been detected in the other program execution device, reading, from the memory by the program execution device, second table information specifying some, but not all of the two or more programs included in the first table information and also specifying one or more additional programs that were to be executed by the other program execution device before the occurrence of the error in the other program execution device, and executing one or more of the programs specified by the read second information, by the program execution device.

* * * * *